C. A. MEREDITH.
VEHICLE SPRING.
APPLICATION FILED JAN. 6, 1908.
970,527.
Patented Sept. 20, 1910.
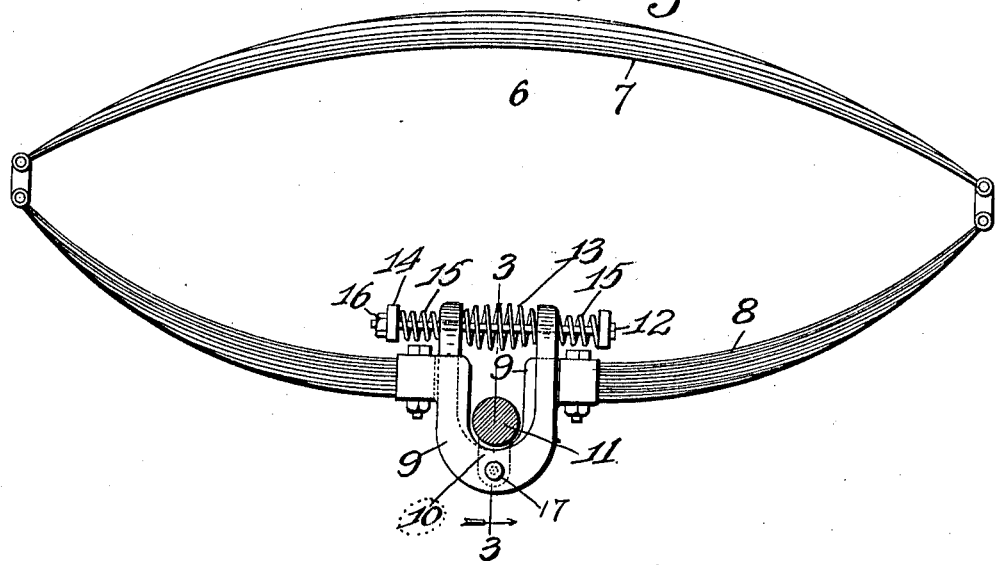
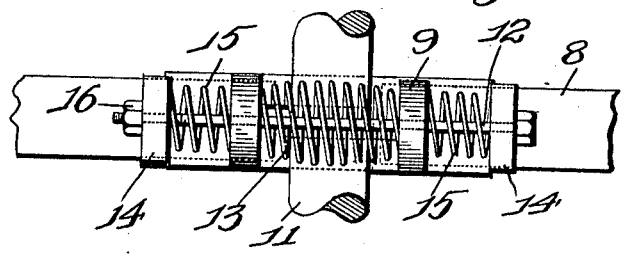
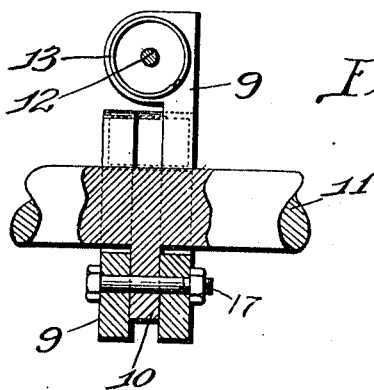
Witnesses
W. C. Stein
L. A. L. McIntyre
Inventor
Charles A. Meredith
by Hopkins & Eicks, Attys.

UNITED STATES PATENT OFFICE.

CHARLES A. MEREDITH, OF ST. LOUIS, MISSOURI.

VEHICLE-SPRING.

970,527. Specification of Letters Patent. Patented Sept. 20, 1910.

Application filed January 6, 1908. Serial No. 409,508.

*To all whom it may concern:*

Be it known that I, CHARLES A. MEREDITH, a citizen of the United States, and resident of St. Louis, Missouri, have invented certain new and useful Improvements in Vehicle-Springs, of which the following is a specification.

My invention relates to improvements in vehicle springs and has for its object to provide a combined vehicle spring and shock absorber consisting of a resilient member divided in two parts, the parts being mounted in supports having a single pivotal connection to the axle; the supports being provided with an auxiliary spring mechanism.

In the drawings Figure 1 is a side elevation of a device embodying my invention. Fig. 2 is a top plan view of the lower divided spring member of the same and the auxiliary spring mechanism. Fig. 3 is a sectional view of the same taken along the line 3—3 of Fig. 1.

In the form of my invention illustrated in the drawings I provide a spring 6 comprising an upper member 7 and a lower member 8, the member 8 being divided in two parts whose inner ends are mounted in and carried by supports 9. The outer ends of the members 7 and 8 are connected in the usual way and the upper member 7 is connected to the vehicle body in any desired manner. The supports 9 are mounted upon the ear 10 which is carried by, and if desired made integral with or welded upon, the axle 11; a single bolt 17 passing through the supports 9 and the ear 10 to form a pivot for the supports 9. The supports 9 are approximately U-shaped in form (see Fig. 1) and in their upper or free ends are provided with bores which register with each other, through which bores the bolt 12 passes. Around said bolt 12 and between the free ends of the supports 9 is placed an auxiliary spring 13, while on the outer sides of the free ends of the members 9 other auxiliary springs 15—15 are mounted. The tension of the said auxiliary springs 13 and 15—15 is regulated by the adjustment of the nut 16 upon the bolt 12.

The mode of operation of my device is evident from the foregoing description. The upper member 7 may be non-resilient if preferred, and the desired resiliency secured through the elasticity of the divided halves of the member 8, which combine with the springs 13 and 15—15 to distribute and absorb the shock which is incident to the striking of obstructions by the vehicle.

The spring thus described is an improvement upon my former invention, patented to me February 4, 1908, being United States Letters Patent No. 878,081.

Having fully described my invention what I claim is:

1. In a vehicle spring the combination of an upper member; a divided lower spring member; a pair of U-shaped supports upon each of which one of the parts of the divided lower spring member is mounted; an axle; an ear carried by the axle; a single pivotal support passing through said ear and through each of said U-shaped members, said pivotal support being parallel with the axle; and an auxiliary spring mechanism interposed between and on the outer faces of said U-shaped supports, substantially as described.

2. In a vehicle spring, the combination of an upper member; a divided lower spring member; a pair of U-shaped supports upon each of which one of the parts of the divided lower spring member is mounted; an axle; an ear carried by the axle; a single pivotal support passing through said ear and through each of said U-shaped members, said pivotal support being parallel with the axle; an auxiliary spring mechanism interposed between and on the outer faces of said U-shaped supports; and a bolt passing through the free ends of said U-shaped supports, whereby said auxiliary springs are carried, substantially as described.

3. In a vehicle spring, the combination of an upper member; a divided lower spring member; a pair of U-shaped supports upon each of which one of the parts of the divided lower spring member is mounted; an axle; an ear carried by the axle; a single pivotal support passing through said ear and through each of said U-shaped members, said pivotal supports being parallel with the axle; an auxiliary spring mechanism interposed between and on the outer faces of said U-shaped supports; and means for adjusting the tension of said auxiliary spring mechanism, substantially as described.

In testimony whereof, I have signed my name to this specification, in presence of two subscribing witnesses.

CHARLES A. MEREDITH.

Witnesses:
ALFRED A. EICKS,
WALTER C. STEIN.